US007626580B2

(12) United States Patent
Keely et al.

(10) Patent No.: US 7,626,580 B2
(45) Date of Patent: *Dec. 1, 2009

(54) HIGHLEVEL ACTIVE PEN MATRIX

(75) Inventors: Leroy B. Keely, Portola Valley, CA (US); Charlton E. Lui, Redmond, WA (US); F. David Jones, Redmond, WA (US); Ryan Edward Cukierman, Redmond, WA (US); Susanne Alysia Clark Cazzanti, Bellevue, WA (US); Marieke Iwema, Renton, WA (US); Robert Jarrett, Snohomish, WA (US)

(73) Assignee: Microsoft Corporation, Redmond, WA (US)

(*) Notice: Subject to any disclaimer, the term of this patent is extended or adjusted under 35 U.S.C. 154(b) by 272 days.

This patent is subject to a terminal disclaimer.

(21) Appl. No.: 11/202,034

(22) Filed: Aug. 12, 2005

(65) Prior Publication Data

US 2006/0033751 A1    Feb. 16, 2006

Related U.S. Application Data

(63) Continuation of application No. 10/993,357, filed on Nov. 22, 2004, now Pat. No. 7,081,889, which is a continuation of application No. 09/736,170, filed on Dec. 15, 2000, now Pat. No. 6,897,853.

(60) Provisional application No. 60/247,400, filed on Nov. 10, 2000.

(51) Int. Cl.
G09G 5/00    (2006.01)

(52) U.S. Cl. .............. 345/179; 382/188; 382/313; 382/314; 715/764; 715/769

(58) Field of Classification Search ......... 345/173–179, 345/581, 691; 715/769, 863, 751, 764, 814; 178/18.01–18.03, 19.01, 20.01; 705/205, 705/231; 382/188, 313, 314

See application file for complete search history.

(56) References Cited

U.S. PATENT DOCUMENTS

| 5,404,439 | A | * | 4/1995 | Moran et al. ............... 715/814 |
| 5,539,427 | A | | 7/1996 | Bricklin et al. |
| 5,543,591 | A | * | 8/1996 | Gillespie et al. .......... 178/18.03 |
| 5,546,527 | A | * | 8/1996 | Fitzpatrick et al. ......... 715/769 |
| 5,548,705 | A | | 8/1996 | Moran et al. |
| 5,572,651 | A | * | 11/1996 | Weber et al. ............... 715/863 |
| 5,596,698 | A | * | 1/1997 | Morgan ..................... 715/863 |
| 5,861,886 | A | * | 1/1999 | Moran et al. ............... 715/863 |
| 5,920,694 | A | * | 7/1999 | Carleton et al. ............ 709/205 |
| 5,986,665 | A | * | 11/1999 | Wrey et al. ................ 345/581 |
| 6,128,007 | A | | 10/2000 | Seybold |

(Continued)

OTHER PUBLICATIONS

U.S. Appl. No. 60/247,182, filed Nov. 10, 2000.

(Continued)

*Primary Examiner*—Srilakshmi K Kumar
(74) *Attorney, Agent, or Firm*—Shook, Hardy & Bacon L.L.P.

(57) ABSTRACT

The present invention relates to a system, method and medium for receiving and acting upon user input. In one embodiment, the user may only have access to a limited input device, like a stylus. Using the present invention, a user is provided with intuitive responses from the system based on inputs from the limited input device.

14 Claims, 7 Drawing Sheets

U.S. PATENT DOCUMENTS

| | | | |
|---|---|---|---|
| 6,173,287 B1 * | 1/2001 | Eberman et al. | 707/102 |
| 6,339,431 B1 * | 1/2002 | Ohmori et al. | 345/619 |
| 6,342,906 B1 | 1/2002 | Kumar et al. | |
| 6,557,042 B1 * | 4/2003 | He et al. | 709/231 |
| 6,897,853 B2 * | 5/2005 | Keely et al. | 345/179 |
| 7,081,889 B2 * | 7/2006 | Keely et al. | 345/179 |

OTHER PUBLICATIONS

U.S. Appl. No. 60/247,973, filed Nov. 10, 2000.
U.S. Appl. No. 60/247,842, filed Nov. 10, 2000.
U.S. Appl. No. 60/247,844, filed Nov. 10, 2000.
U.S. Appl. No. 60/247,400, filed Nov. 10, 2000.
U.S. Appl. No. 60/247,972, filed Nov. 10, 2000.
U.S. Appl. No. 60/247,831, filed Nov. 10, 2000.
U.S. Appl. No. 60/247,843, filed Nov. 10, 2000.
U.S. Appl. No. 60/247,479, filed Nov. 10, 2000.

* cited by examiner

HIGHLEVEL ACTIVE PEN MATRIX

CROSS-REFERENCE TO RELATED APPLICATIONS

The present application is a continuation of U.S. patent application Ser. No. 10/993,357, filed Nov. 22, 2004 which is a continuation of U.S. patent application Ser. No. 09/736,170, filed Dec. 15, 2000, now issued as U.S. Pat. No. 6,897,853, which claims priority to U.S. Provisional Patent Application Ser. No. 60/247,400, filed Nov. 10, 2000, each of which is incorporated by reference herein as to its entirety.

FIELD OF THE INVENTION

Aspects of the present invention are directed generally to apparatus and methods for controlling a graphical user interface (GUI). More particularly, the present invention relates to receiving user input, determining based on the user input what the user wants to do, and performing a function related to the desired input.

BACKGROUND OF THE INVENTION

Typical computer systems, especially computer systems using graphical user interface (GUI) systems such as Microsoft WINDOWS, are optimized for accepting user input from one or more discrete input devices such as a keyboard and for entering text, and a pointing device such as a mouse with one or more buttons for driving the user interface. Virtually all software applications designed to run on Microsoft WINDOWS are optimized to accept user input in the same manner. For instance, many applications make extensive use of the right mouse button (a "right click") to display context-sensitive command menus. The user may generate other gestures using the mouse such as by clicking the left button of the mouse (a "left click"), or by clicking the left or right button of the mouse and moving the mouse while the button is depressed (either a "left click drag" or a "right click drag").

In some environments, a mouse is not usable or desirable. For example, in a digitizer tablet environment, the primary input device may be a stylus. While a stylus attempts to provide pad and paper-like feel to a computing environment, current systems are limited. For example, the use of a stylus in a graphical user interface is limited to tapping on various items for selection. See, for example, the Palm-series of products using the Palm OS 3.0 operating system. Further, in stylus-based input environments, a user is continually forced to select tools or operations from a remote tool bar, generally on a top or bottom of a screen. While a user can type in letters or have the digitizer recognize handwriting, these operations require selecting a keyboard input mode and writing in a predefined portion of the digitizer, respectively. In short, requiring a user to tell the computer, for every new input, what a user wants to do makes stylus-based computing difficult for the average user. Accordingly, stylus based inputs have been relegated to personal data assistants (PDAs) where significant user input is not possible. Mainstream computing still requires the use of at least a keyboard and mouse (or mouse-based input device, for example, trackballs, touch-pads, and other mouse substitutes).

Accordingly, a need exists for permitting a user to perform all operations of a mouse-type device using a stylus.

SUMMARY OF THE INVENTION

As discussed in the various copending patent applications incorporated herein by reference, aspects of the present invention are directed to a tablet-like computer that allows users to directly write on a display surface using a stylus. The display surface may physically, optically, and or electro magnetically detect the stylus. The computer may allow the user to write and to edit, manipulate, and create objects through the use of the stylus. Many of the features discussed in these copending applications are more easily performed by use of the various aspects of the present invention discussed herein.

An aspect of the present invention is directed to methods and apparatus for simulating gestures of a mouse by use of a stylus on a display surface. The present invention determines the operation a user wants to perform based on the user's input. This determination may include reference to other information including the location of the user's input on a digitizer (e.g., location on a screen) and the status of other objects or elements as displayed. By using this information, the system determines what the user wants to do and implements the action.

A number of inputs with a stylus are possible. For example, a user may tap a stylus, stroke the stylus, hold the stylus at a given point, or hold then drag the stylus. Other inputs and combinations are possible as noted by the above-identified applications, which are expressly incorporated herein by reference.

As to a stroke operation, the system may drag an object, may maintain a current state or operation, or being inking. Inking may include writing, drawing, or adding annotations as described in greater detail in U.S. Ser. No. 60/212,825, filed Jun. 21, 2000, entitled "Methods for Classifying, Anchoring, and Transforming Ink Annotations" and incorporated by reference.

As to a tap operation, the system may add to existing writing, may select a new object, insert a cursor or insertion point, or may perform an action on a selected object.

As to a hold operation, the system may simulate a right mouse button click or other definable event.

As to a hold and drag operation, the system may drag a selected object or perform other functions.

These and other features of the invention will be apparent upon consideration of the following detailed description of preferred embodiments. Although the invention has been defined using the appended claims, these claims are exemplary in that the invention is intended to include the elements and steps described herein in any combination or subcombination. Accordingly, there are any number of alternative combinations for defining the invention, which incorporate one or more elements from the specification, including the description, claims, and drawings, in various combinations or subcombinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It is intended that the written description of the invention contained herein covers all such modifications and alterations.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention. In the accompanying drawings, elements are labeled with three-digit reference numbers, wherein the first digit of a reference number indicates the drawing number in which the element is first illustrated. The same reference number in different drawings refers to the same element.

DETAILED DESCRIPTION OF PREFERRED EMBODIMENTS

Figure 1:
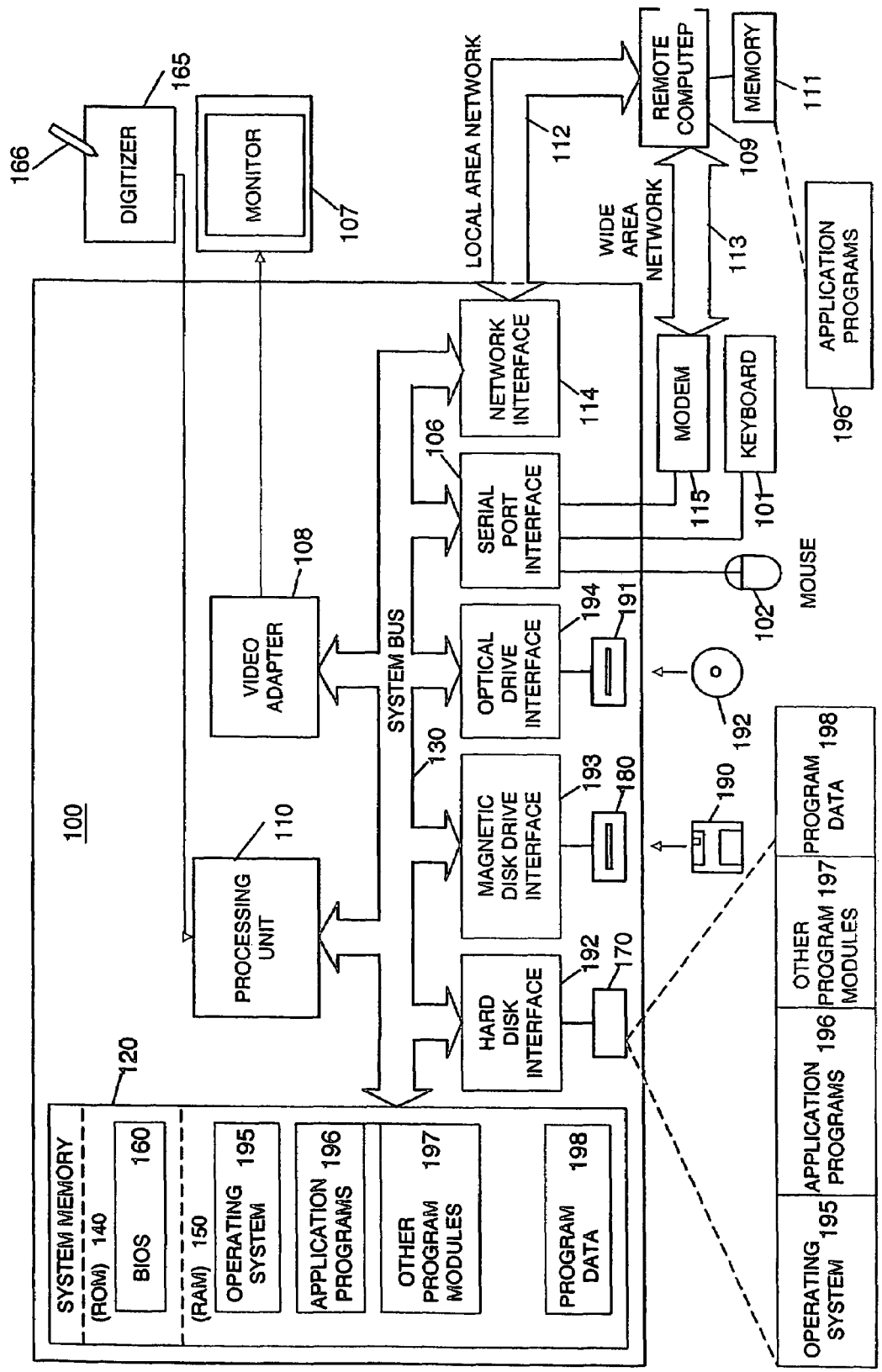
FIG. 1 is a schematic diagram of a general-purpose digital computing environment that can be used to implement various aspects of the invention.

The present invention may be more readily described with reference to FIGS. 1-7. FIG. 1 illustrates a schematic diagram of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
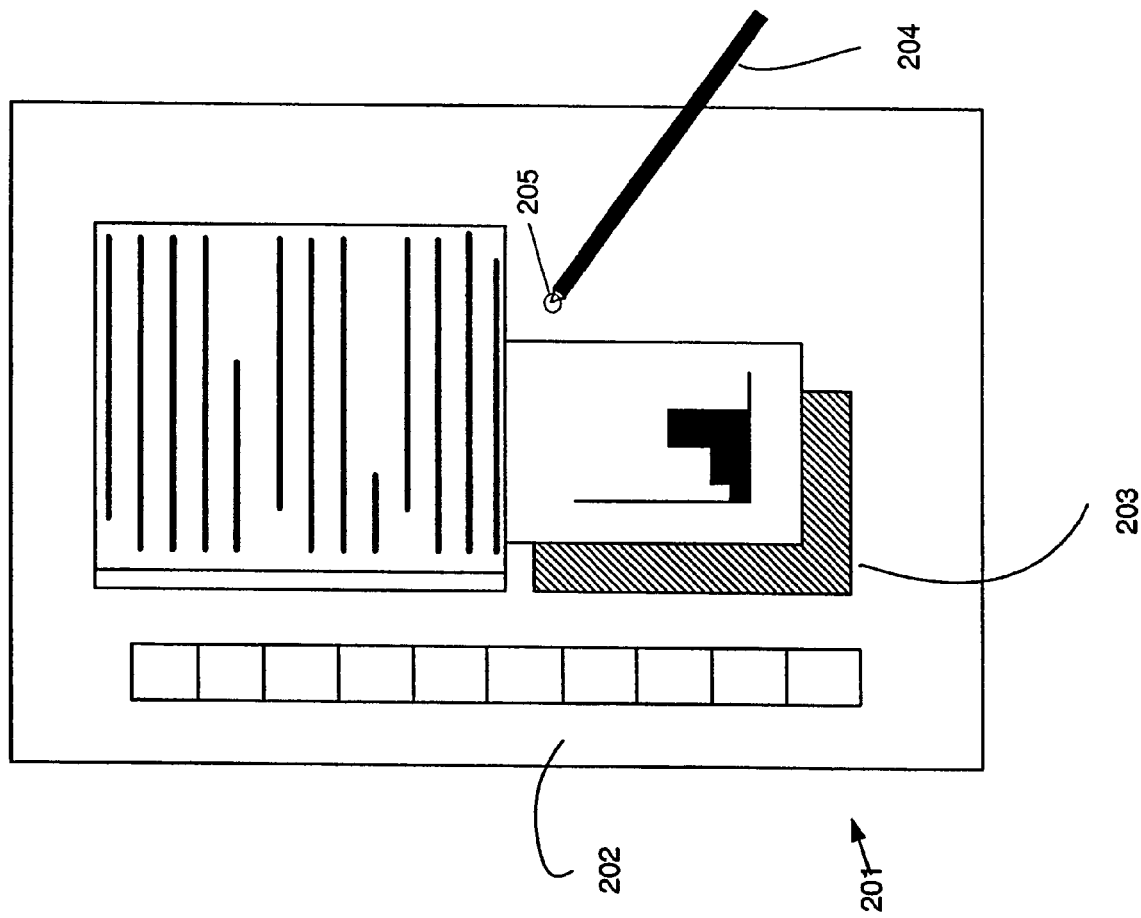
FIG. 2 is a plan view of a tablet computer and stylus that can be used in accordance with various aspects of the present invention.
Figure 3:
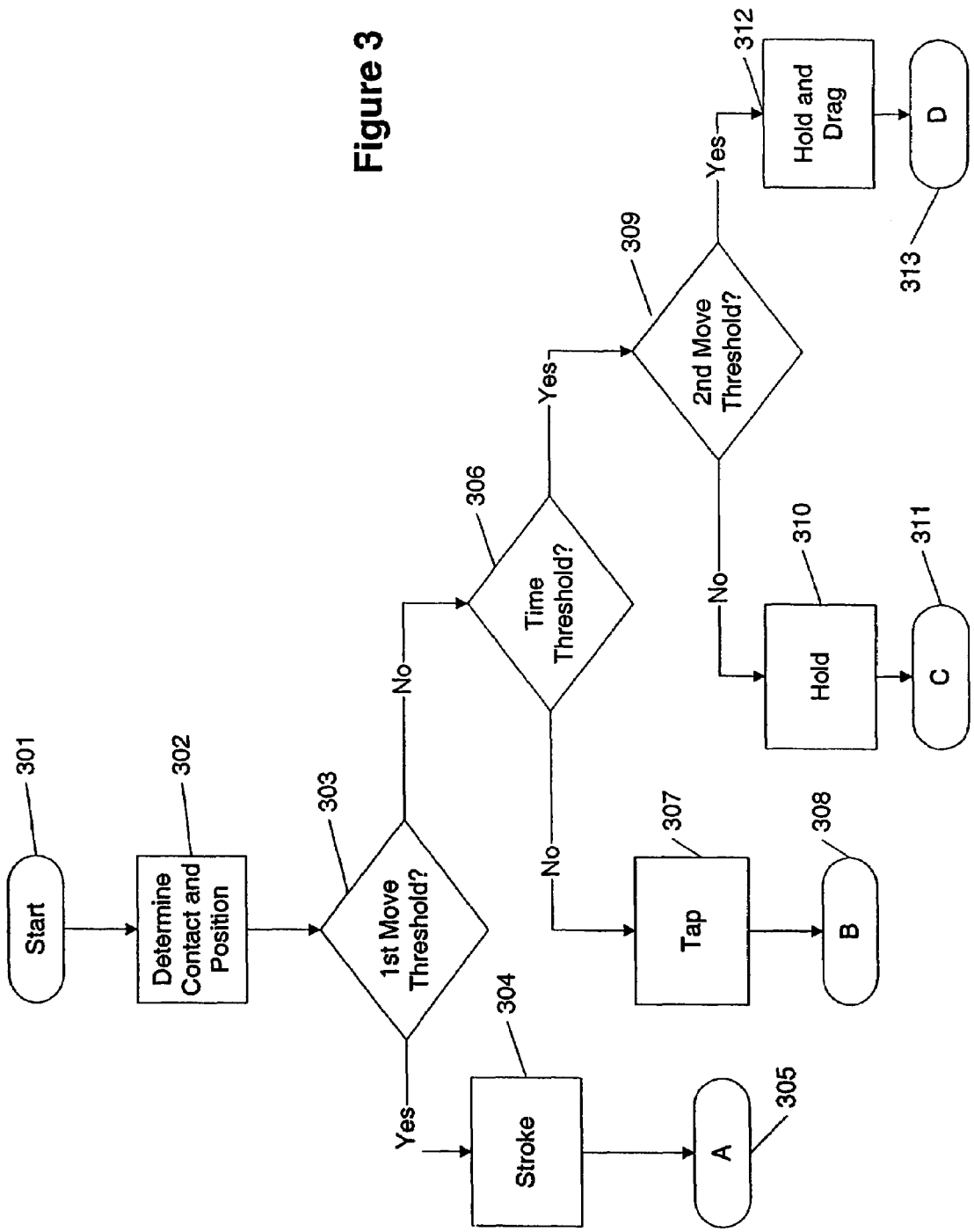
FIGS. 3-7 are flowcharts showing a variety of steps for interpreting a user's input in accordance with embodiments of the present invention.

FIG. 2 illustrates a tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and write on the digitizing display area. Examples of suitable digitizing display panels include electromagnetic pen digitizers, such as the Mutoh or Wacom pen digitizers. Other types of pen digitizers, e.g., optical digitizers, may also be used. Tablet PC 201 interprets marks made using stylus 204 in order to manipulate data, enter text, and execute conventional computer application tasks such as spreadsheets, word processing programs, and the like.

A stylus could be equipped with buttons or other features to augment its selection capabilities. In one embodiment, a stylus could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be used for selecting or indicating portions of the displayed image on a touch-sensitive or proximity-sensitive display. Consequently, the term "user input device", as used herein, is intended to have a broad definition and encompasses many variations on well-known input devices.

Region 205 shows a feed back region or contact region permitting the user to determine where the stylus as contacted the digitizer. In another embodiment, the region 205 provides visual feedback when the hold status of the present invention has been reached.

FIGS. 3-7 show various flowcharts for determining what a user wants to do based on a user's interaction with the digitizer. As will be discussed below, the user contacts the digitizer where the user wants to begin writing, tapping, annotating, dragging, etc. In the case where the digitizer is superimposed over a display, the user's contact with the digitizer is directed at operating at (or near) the contact point between the user's stylus and the currently displayed information at or near the contact point.

In step 301, the system senses a contact or other indication of an action. In one embodiment the contact may be the stylus contacting the surface of the digitizer. In another embodiment, the action may be bringing the tip of the stylus near the digitizer's surface. Further, if the stylus includes another signaling method (for example, a radio transmitter transmitting a signal to the digitizer signaling a user's input), the digitizer (or related input mechanism or mechanisms) interpret the received signal as a user's input. Other methods of starting an operation or writing or contact with a digitizer are known in the art. For purposes of illustration and description, the system and method reference physical contact with the digitizer. All other ways of providing signals to a processor are considered within the scope of the invention and are not mentioned here for simplicity.

In step 302, the system determines the contact position and what lies beneath the contact position (for example, an object, a drawing, blank space, ink, and the like). In step 303, the system determines if the stylus has moved beyond a first threshold (time, distance, rate, or acceleration, and the like). In one embodiment, the threshold is set to the minimum resolvable movement. In another embodiment, the threshold is set higher to account for shaky hands, vibrations of the digitizer or tablet pc (for example, if trying to use the system while driving in a car over a bumpy road). It is noted that objects may have all the same threshold. Alternatively, objects may have different thresholds. This may be dependent on the object, the size of the object, the state of the system, the state of the object, and the like.

If the first threshold has been exceeded, then the system proceeds to step 304 where the user's input is classified as a stroke and the system steps to point A 305. If the first threshold has not been exceeded, the system determines if the stylus was still in contact with the digitizer when a time threshold had expired in step 306. If no (meaning that the stylus was still in contact with the digitizer surface), the system classifies the input as a tap in step 307 and proceeds to point B 308.

If the stylus was still in contact with the surface after the time threshold in step 306, the system determines if a second move threshold was exceeded in step 309. The first and second move thresholds may be identical or different. For example, both may be 0.25 mm. Or, the first may be 0.5 mm or one mm and the second be 0.3 mm. Further, the first may be 1.2 mm or more and the second may be 0.5 mm or more. In short, any values may be used as long as they are not obtrusive to the user. The second threshold may be determined only after the time threshold of step 306 has expired. In this example, the second threshold may be higher than the first threshold (or it may be the same or smaller).

If the second move threshold was not exceeded, then the system classifies the input as a hold in step 310 and proceeds to point C 311. If the second move threshold was exceeded, then the system classifies the input as a 'hold and drag' in step 312 and moves to point D 313.

Figure 4:
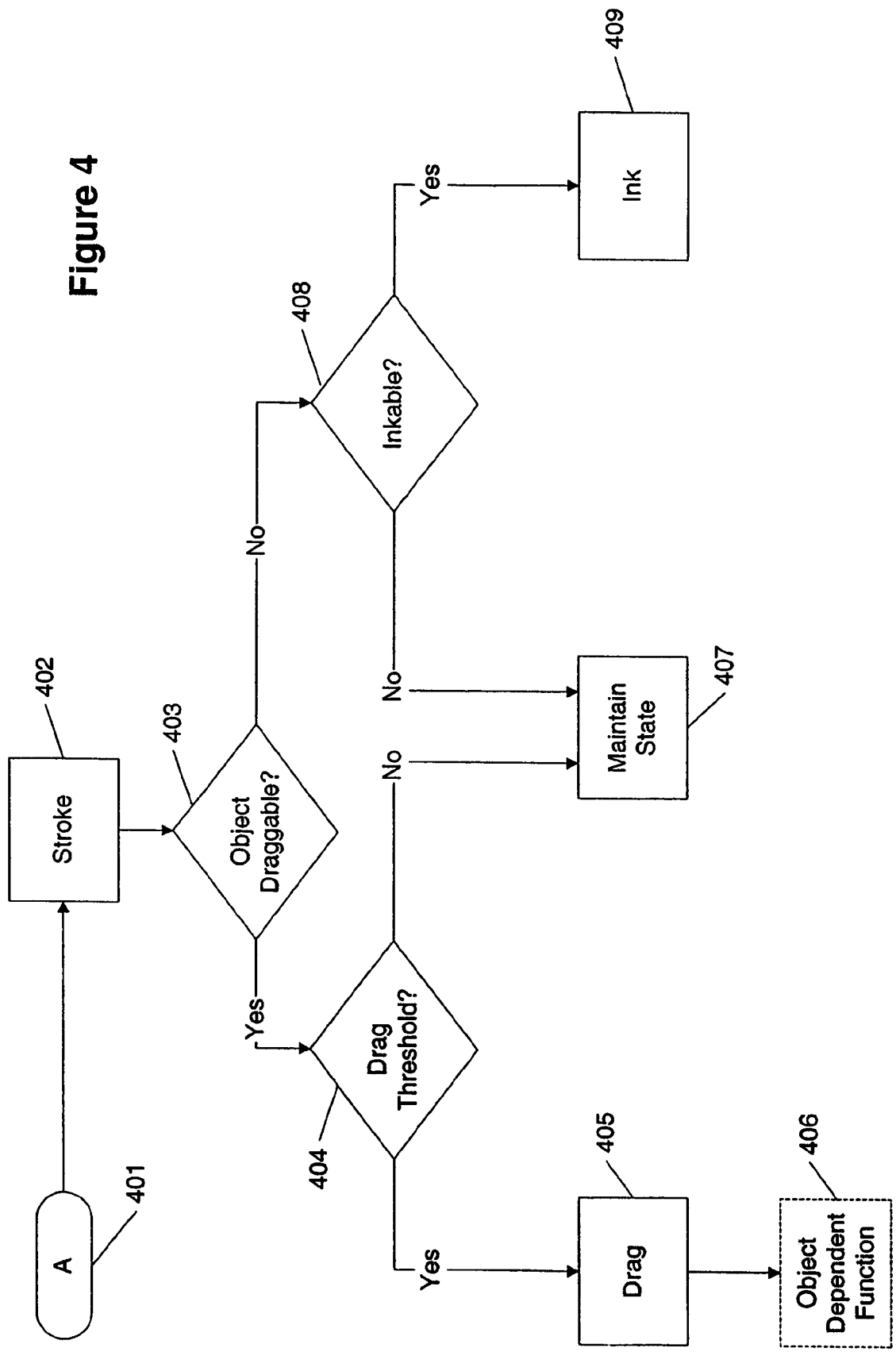

FIG. 4 shows point A as starting point 401. Here, the system classified the input as a stroke and begins stroke processing in step 402. In step 403, the system determines if the stroke started on a draggable object. If yes, the system determines in step 404 whether drag threshold was exceeded (for example, 0.25 inches, 0.25 inches per second and the like). If so, the system classifies the stroke as a drag in step 405 and performs a function that is dependent on the object. For example, the drag may extend a selection as described in greater detail in "Selection Handles in Editing Electronic Documents," filed concurrently with the present application Ser. No. 60/247,973, and expressly incorporated by reference. Also, the drag may operate a bungee tool as described in Ser. No. 60/247,842, entitled "Insertion Point Bungee Space Tool", and filed concurrently with the present application, and expressly incorporated herein.

If, in step 404, the drag threshold has not been exceeded, the system maintains the current state (with the object being selected or not) in step 407. If the stroke was not over a draggable object in step 403, the system determines if the area under the contact point is inkable in step 408. For example, inkable may mean an area capable of receiving ink (including drawings, annotations, or writing) as detailed in Ser. No. 60/212,825, filed Jun. 21, 2000, and expressly incorporated herein by reference for essential subject matter. By contrast, a control button (for copy, save, open, etc.) may not be inkable. If inkable in step 408, the system permits inking (drawing, writing, annotating and other related functions) in step 409. If not inkable, the system maintains the current state (objects selected or not) in step 407.

Figure 5A:
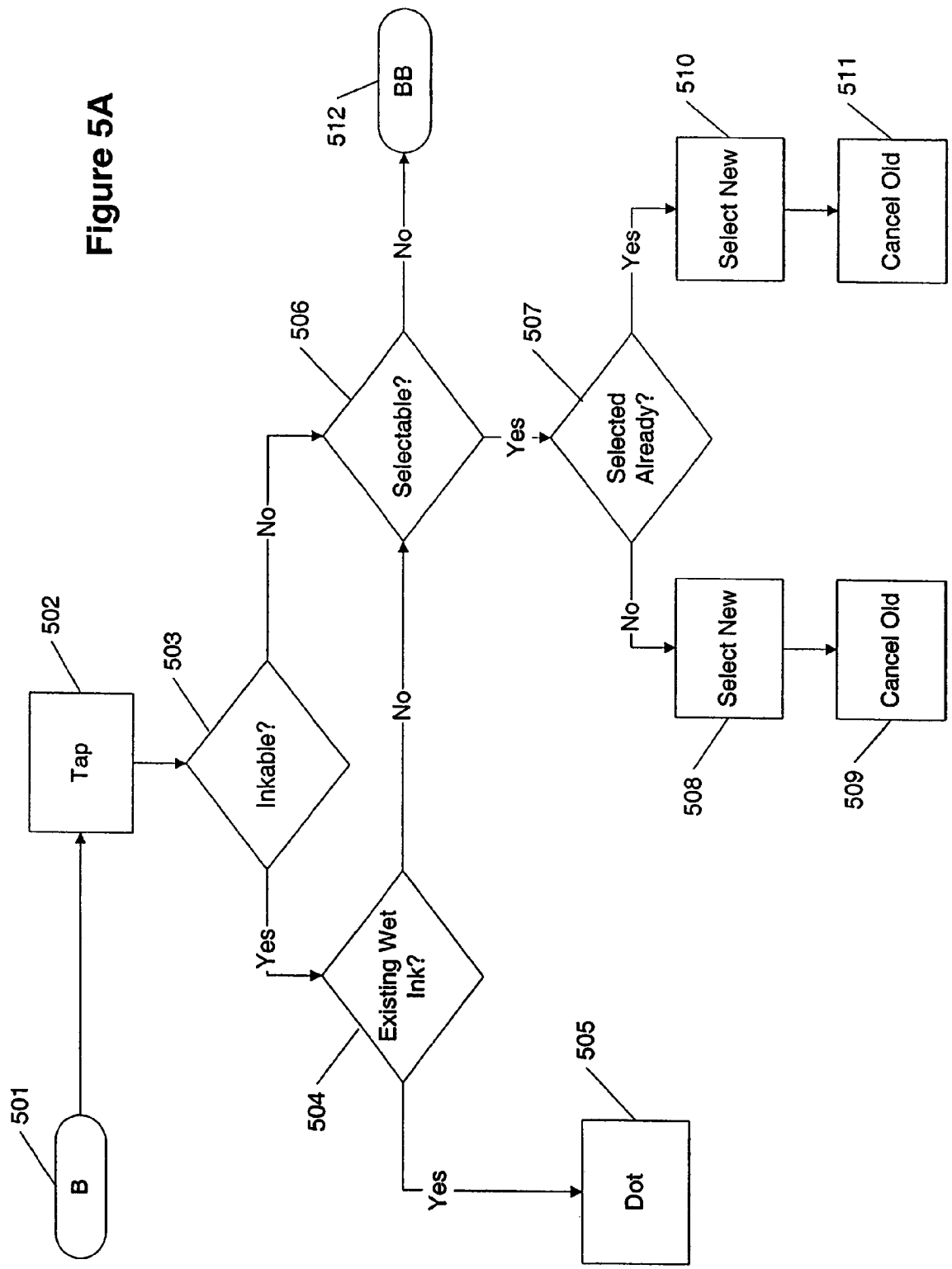

In FIG. 5A, the system starts at point B 501 and operates on the input as a tap 502. The system determines whether the tap was on an area or object that is inkable in step 503. If yes, the system determines whether any ink was recently added or "wet" (for example, less than 0.5 or 1 second old) in step 504. If so, the system considers the tap as a dot to be added to the ink in step 505 (and adds the dot). If no wet ink exists, then the system determines if the tap was over a selectable object in step 506. It is noted that steps 503 and 504 may be combined. If the tap was over a selectable object, then the system determines if the object was already selected in step 507. If it was not, then the system selects the tapped object in step 508. If a previous object had been selected, the system cancels the previous or old selection in step 509. If the object was previously selected as determined by step 507, the system performs an action relevant to the object in step 510. This action may include editing the object, performing a predefined operation (for example, enlarge, shrink and the like). From step 506, if the tap was not on a selectable object, then the system proceeds to point BB 512.

Figure 5B:
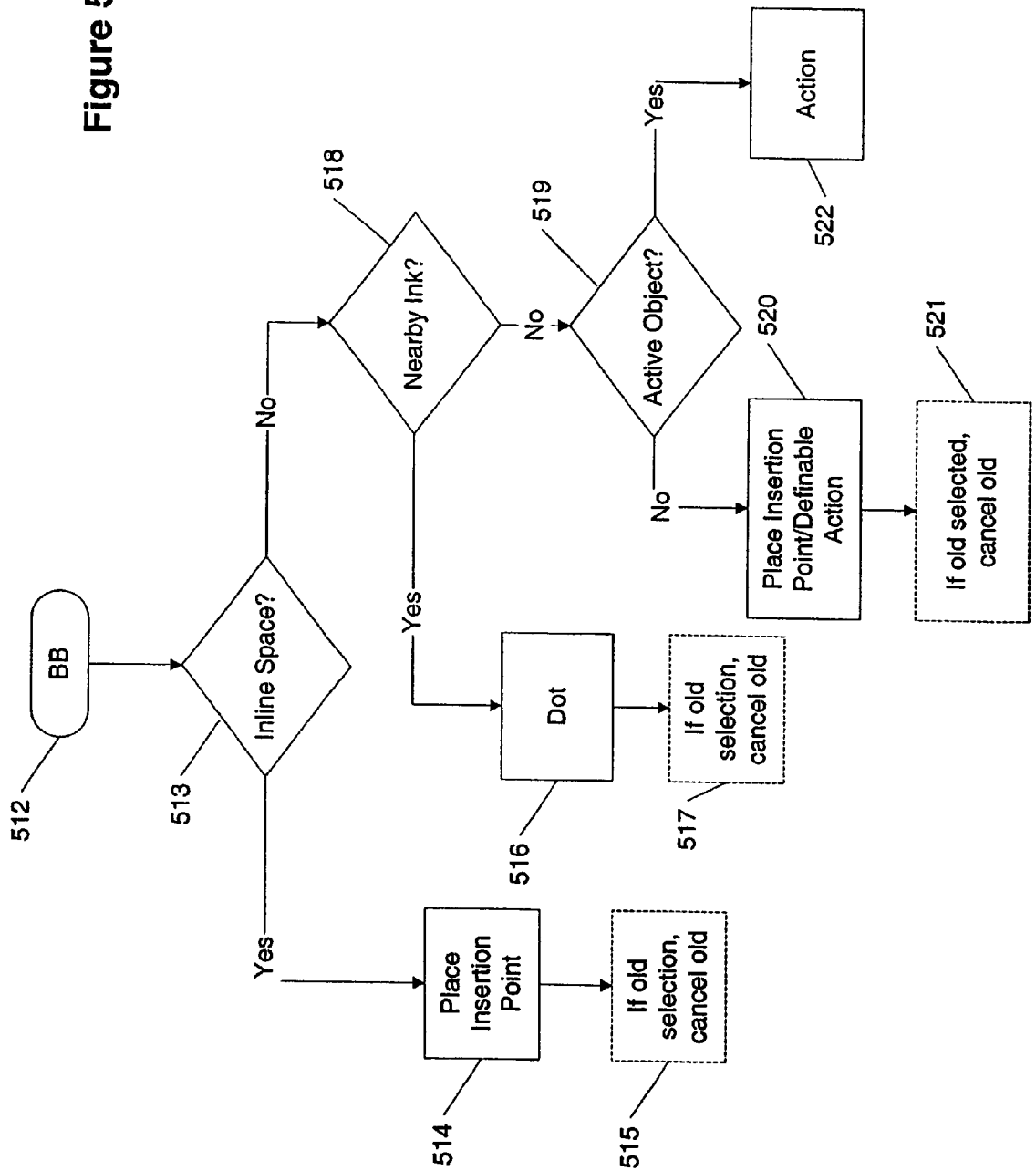

FIG. 5B shows additional processing to FIG. 5A. As point BB 512, the system determines if the tap was in a space between text (referred to herein as an inline space) in step 513. If yes, the system places an insertion point at the tap point in step 514. As shown in a broken lined box, the system may also cancel any old or previous selections in step 515. If no, then the system determines if the tap point has ink nearby in step 518. If the system determines that the tap was nearby ink, then the system adds a dot to the ink in step 516. If there was an old selection, then the system cancels the old selection in step 517 (as shown by a broken line box).

If not nearby ink in step 518, the system determines if the tap is on an active object in step 519. If the tap was not on an active object, the system places an insertion point at the tap point or performs some other definable action in step 520. Again, if there was an old selection, then the system cancels the old selection in step 521 (as shown by a broken line box). If the tap was on an active object as determined by step 519, the system performs an action in step 522. The action may be definable by the user or relate to any function desirable. In one embodiment, the action may be to perform a function to operate a selection handle or bungee space tool as described in Ser. No. 60/247,973, "Selection Handles in Editing Electronic Documents," filed concurrently with the present application and expressly incorporated by reference. Also, the drag may operate a bungee tool as described in Ser. No. 60/247,842, entitled "Insertion Point Bungee Space Tool", and filed concurrently with the present application, and expressly incorporated herein. Other operations are known in the art and incorporated herein.

Figure 6:
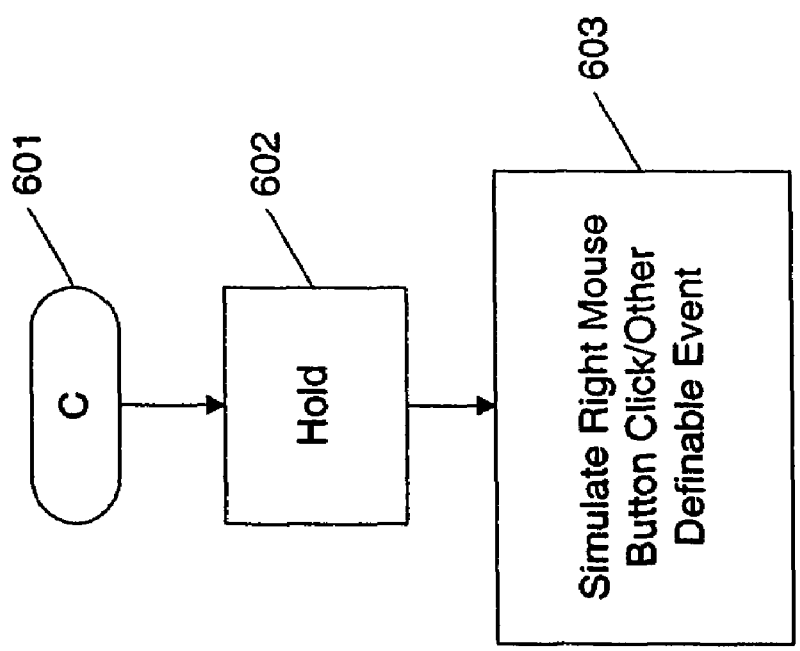

FIG. 6 relates to holding a stylus beyond a time threshold. Starting from point C 601, the system classifies the user input as a hold operation in step 602. Next, the system simulates a right mouse button click or other definable event in step 603. The functions associated with step 603 are described in greater detail in U.S. application Ser. No. 60/247,844, entitled "Simulating Gestures of a Mouse Using a Stylus and Providing Feedback Thereto", filed Nov. 10, 2000, whose contents are expressly incorporated herein by reference.

Figure 7:
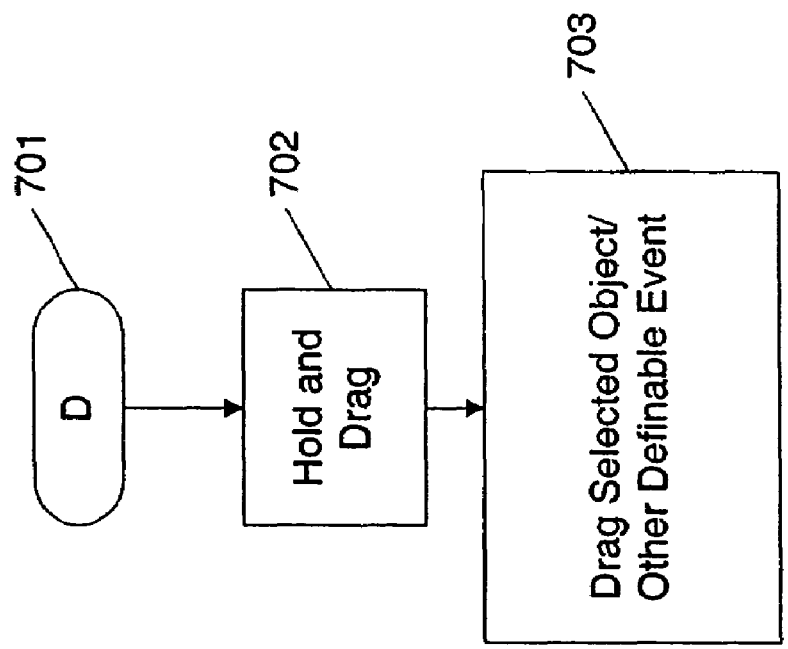

FIG. 7 relates to holding a stylus beyond a time threshold and moving the stylus. Starting from point D 701, the system classifies the user input as a hold and drag operation in step 702. Next, in step 703 the system drags the selected object as directed by the user.

There are a number of alternatives associated with dragging. If the hold and drag relates to an inline space, the system may use this hold and drag function to select text. Similarly, one may use this function to select a drawing encountered by the dragged stylus. Further, one may select both text and drawings in this manner. Also, the cursor's point may become a selection tool that leaves a trail behind it. In this regard, the user may loop a number of objects, drawing or text in this regard. The looping of the objects may result in the selecting of the objects.

An alternate embodiment of the present invention relates to modifying ink drawings or annotations. For example, if one added an annotation (from step 409) to text, one may manipulate the text (for example, by inserting new text) and have the annotation track the manipulation of the text. So, if one circled text then added text to the circled text, the annotation would expand to include the added text as well. This is described in relation to in U.S. Ser. No. 60/212,825, filed Jun. 21, 2000, entitled "Methods for Classifying, Anchoring, and Transforming Ink Annotations" and incorporated by reference.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments.

We claim:

1. A computer-readable medium storing computer-executable instructions for performing steps comprising:
   receiving a user input to a digitizer;
   classifying the user input as a stroke if the user input satisfies a first move threshold;
   classifying the user input as a tap if the user input fails to satisfy both the first move threshold and a time threshold;
   classifying the user input as a hold if the user input satisfies the time threshold but fails to satisfy both the first move threshold and a second move threshold different from the first move threshold, wherein after determining the hold, triggering a definable event; and
   classifying the user input as a hold and drag if the user input satisfies both the time threshold and the second move threshold but fails to satisfy the first move threshold.

2. The computer-readable medium of claim 1 wherein receiving the user input to the digitizer includes detecting a user's finger by the digitizer.

3. A computer-readable medium storing computer-executable instructions for performing steps comprising:
   receiving user input to a digitizer;
   first determining whether the user input moves at least a first distance;
   second determining whether the user input ends before a certain amount of time; and
   responsive to the user input failing to move at least the first distance within the certain amount of time and failing to end before the certain amount of time, third determining whether the user input moves at least a second distance larger than the first distance,
   wherein if the user input satisfies the first determining step and second determining step but fails to satisfy the third determining step, classifying the user input as a tap and triggering a definable event.

4. The computer-readable medium of claim 3, wherein the user input is caused by a stylus contacting the digitizer, and the user input ends when the stylus no longer contacts the digitizer.

5. The computer-readable medium of claim 3, wherein the computer-executable steps are further for performing steps of:
   responsive to the user input moving at least the first distance as determined by the step of first determining, classifying the user input as a first type of input;
   responsive to the user input ending before the certain amount of time as determined by the step of second determining, classifying the user input as a second type of input different from the first type of input; and
   responsive to an outcome of the step of third determining, classifying the user input as either a third type of input different from the first and second types of input or a fourth type of input different from the first, second, and third types of input.

6. The computer-readable medium of claim 3, wherein the computer-executable instructions are further for performing a step of, responsive to the user input moving at least the first distance as determined by the step of first determining, fourth determining whether the input begins on a draggable object.

7. The computer-readable medium of claim 6, wherein the computer-executable instructions are further for performing a step of, responsive to the user input beginning on a draggable object as determined by the step of fourth determining, fifth determining whether the user input satisfies a drag threshold.

8. The computer-readable medium of claim 3 wherein the user input is caused by a digitizer detecting a user's finger in contact with the digitizer, and the user input ends when the digitizer no longer detects the user's finger in contact with the digitizer.

9. A computer-readable medium storing computer-executable instructions for performing steps comprising:
   receiving a user's input; and
   first determining whether the input is a stroke based on a first move threshold;
   if the input is not a stroke, then second determining whether the input is a tap based on a time threshold and triggering a definable event;
   if the input is neither a stroke nor a tap, then third determining whether the stroke is a hold based on a second move threshold larger than the first move threshold, wherein said input satisfies said time threshold and said input does not satisfy said second move threshold; or a hold and drag when the input satisfies said time threshold and said input satisfies said second move threshold.

10. The computer-readable medium of 9, wherein, if said input satisfies said first move threshold, the input is classified as a stroke.

11. The computer-readable medium of claim 9, wherein, if said input does not satisfy said first move threshold and said input does not satisfy said time threshold, the input is classified as a tap.

12. The computer-readable medium of claim 9, wherein the computer-executable instructions are further for performing a step of simulating a right mouse click responsive to said input being classified as a hold.

13. The computer-readable medium of claim 9, wherein the computer-executable instructions are further for performing a step of dragging a selected object responsive to said input being classified as a hold and drag.

14. The computer-readable medium of claim 9 wherein the user's input is received at a touch-sensitive display that detects contact with a user's finger.

* * * * *

UNITED STATES PATENT AND TRADEMARK OFFICE
CERTIFICATE OF CORRECTION

PATENT NO. : 7,626,580 B2 Page 1 of 1
APPLICATION NO. : 11/202034
DATED : December 1, 2009
INVENTOR(S) : Keely et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 456 days.

Signed and Sealed this

Second Day of November, 2010

David J. Kappos
*Director of the United States Patent and Trademark Office*